(12) United States Patent
Percy et al.

(10) Patent No.: US 7,310,930 B2
(45) Date of Patent: Dec. 25, 2007

(54) GRASS CATCHER REINFORCEMENT

(75) Inventors: Richard Floyd Percy, Holly Springs, NC (US); Ronald Lee Reichen, Raleigh, NC (US); William Barry Lambeth, Jr., Sanford, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/729,521

(22) Filed: Dec. 5, 2003

(65) Prior Publication Data

US 2005/0120697 A1 Jun. 9, 2005

(51) Int. Cl.
*A01D 34/00* (2006.01)
*A01D 43/00* (2006.01)
*A01D 43/06* (2006.01)

(52) U.S. Cl. ........................................................ 56/199
(58) Field of Classification Search ................... 56/202, 56/203, 16.6, 320.2; 403/386, 384
See application file for complete search history.

(56) References Cited

U.S. PATENT DOCUMENTS

| | | | |
|---|---|---|---|
| 939,068 A | 11/1909 | McGrath | |
| 1,484,084 A * | 2/1924 | Rohrbach | 56/199 |
| 1,999,102 A * | 4/1935 | Kirby | 56/199 |
| 2,440,934 A * | 5/1948 | De Vol | 56/199 |
| 2,568,045 A | 9/1951 | Weisert | 56/202 |
| 2,579,103 A * | 12/1951 | Whittaker | 56/200 |
| 3,110,147 A * | 11/1963 | Barth | 56/199 |
| 3,129,550 A * | 4/1964 | Waag | 56/199 |
| 3,378,297 A * | 4/1968 | Ford et al. | 296/97.9 |
| 3,383,132 A * | 5/1968 | Stamp | 296/97.6 |
| 3,408,801 A * | 11/1968 | Kroll | 56/199 |
| 3,517,493 A * | 6/1970 | Kiteley | 56/194 |
| 3,553,947 A * | 1/1971 | Root | 56/202 |
| 3,597,786 A * | 8/1971 | Ruhl | 15/79.1 |
| 3,726,069 A * | 4/1973 | Cope | 56/202 |
| 3,820,312 A | 6/1974 | Robinson | 56/202 |
| 3,875,729 A * | 4/1975 | Partsch | 56/199 |
| 4,149,363 A * | 4/1979 | Woelffer et al. | 56/202 |
| 4,179,860 A * | 12/1979 | Reale | 52/731.8 |
| 4,239,278 A * | 12/1980 | Skilliter, Jr. | 296/97.1 |
| 4,648,238 A | 3/1987 | Greider et al. | 56/202 |
| 4,858,861 A * | 8/1989 | Wilkinson, III | 248/74.1 |
| 4,924,663 A * | 5/1990 | Ehn et al. | 56/202 |
| 4,936,083 A * | 6/1990 | Deutsch | 56/202 |
| 4,970,852 A * | 11/1990 | Check et al. | 56/199 |
| 5,412,931 A | 5/1995 | Reichen et al. | 56/199 |
| 6,085,509 A * | 7/2000 | Plamper et al. | 56/202 |
| 6,155,034 A * | 12/2000 | Velke et al. | 56/16.6 |
| 6,237,313 B1 | 5/2001 | Leden | 56/199 |
| 6,595,737 B1 | 7/2003 | Parish | 414/519 |
| 6,637,081 B1 * | 10/2003 | Kulkaski | 24/462 |

* cited by examiner

*Primary Examiner*—Árpád Fábián Kovács

(57) ABSTRACT

A reinforced grass catcher may be positioned adjacent a cutting unit of a grass mower, the reinforced grass catcher having a pair of sides, an upper panel and a lower panel, an opening between the upper panel and lower panel facing the cutting unit, and at least one retaining structure integrally formed with the lower panel adjacent the opening. The reinforcing member may be inserted through the retaining structure or structures. Each retaining structure may be a channel, passage, opening, cavity, groove, hollow, notch, slot, hole, indentation, tunnel, port, aperture or recess that is integral with the lower panel. The reinforcing member resists or limits warping or bending of the grass catcher at or near the opening. The reinforcing member prevents loss of grass clippings through a gap between the grass catcher and cutting unit.

5 Claims, 3 Drawing Sheets

GRASS CATCHER REINFORCEMENT

FIELD OF THE INVENTION

This invention relates generally to grass mowing equipment, and more specifically to grass catchers made from plastic or the like that collect grass clippings discharged by the mower.

BACKGROUND OF THE INVENTION

Grass catchers for mowers are generally box-shaped structures with an opening facing the cutting unit to receive grass clippings discharged by the cutting unit. The box-shaped structure may have opposing sides, a lower wall or panel, and an upper wall or panel. At the opening, the lower wall or panel may include a lip facing the cutting unit. When in use, the lip should be positioned next to the cutting unit. For example, the lip may engage, abut, touch or rest on a corresponding surface of the cutting unit, such as a lateral support bar.

Grass catching devices have been made of materials intended to provide a durable container having minimum weight and cost. For example, some grass catchers have been one-piece molded structures made from plastic or other rigid or semi-rigid materials.

Grass catchers that are made from plastic or similar materials have a tendency to warp, bend, or otherwise become damaged. Grass catchers may warp or bend due to wear and tear, weather and/or temperature extremes and variations, excessive and repeated loading with wet grass clippings or other materials, and other conditions which defy description. After warping or bending, the lip of the lower panel of a grass catcher may no longer fit close to the cutting unit. Instead, a gap as large as an inch or more may open up between the grass catcher lip and cutting unit. If a gap opens, cut grass may fall under the grass catcher or may escape between the grass catcher and the cutting unit. A grass catcher that is warped or bent, especially at or near the lip of the opening, may fail to adequately or sufficiently collect grass from the cutting unit. Instead, cut grass may have to be collected manually, or the grass catcher may need to be replaced.

In an attempt to solve this problem of warping or bending, one approach has been to fasten a stiff metal bar near the lip of the grass catcher using attachment hardware such as rivets. Rivets may extend through holes in the metal bar that match corresponding holes in the lip of the grass catcher. This is unsatisfactory for two reasons. First, using attachment hardware such as rivets to fasten a metal bar to the lip of a grass catcher lengthens assembly time and increases manufacturing costs. Second, rivets or other attachment hardware tend to break or become dislodged due to normal wear and tear, as well as many other adverse conditions that may cause the metal bar to become loose.

Another approach that has been suggested is molding lateral ribs in the lower wall or panel of a grass catcher. An example of this approach is shown in U.S. Pat. No. 4,924,663. This approach, however, is unsatisfactory because the grass catcher may still be subject to warping or bending.

Warping or bending of grass catchers is a very common problem for reel-type lawn mowers. Reel-type mowers generally are used for golf courses, fields and other mowing applications that demand a very high quality of cut. The cutting unit(s) of a reel-type mower may include a frame in which each cutting reel is driven by a motor for rotation about a generally horizontal and laterally extending axis. Grass is cut between the rotating reel blades and a bedknife mounted between the side frames of the cutting unit. To achieve a clean surface after cutting, it is highly desirable to collect cut grass clippings discharged from a reel-type mower using a grass catcher. Grass catchers for reel-type mowers may be positioned adjacent the cutting unit, either forwardly or rearwardly of the cutting unit. The grass catcher may rest or be releasably coupled to the mower using a variety of different alternative attachment devices so that the grass catcher is supported and positioned sufficiently close to the reel to receive and collect clippings from the reel.

What is needed is an improved grass catcher that is reinforced to protect it from warping or bending, especially near the lip facing the cutting unit. A grass catcher reinforcement also is needed that may be manufactured and/or assembled without use of rivets, threaded fasteners, or other attachment hardware. An improved grass catcher also is needed that may be reinforced without significant additional cost. An improved grass catcher is needed that will outlast conventional grass catchers without a gap between the lip and the cutting unit.

SUMMARY OF THE INVENTION

A reinforced grass catcher has a reinforcing member that is retained at the lower wall or panel adjacent the lip of the lower wall or panel. The reinforced grass catcher may be positioned adjacent a cutting unit of a mower and helps prevent any gaps between the lip and the cutting unit. The reinforcing member prevents loss of grass clippings through a gap between the grass catcher and cutting unit.

The grass catcher has a pair of sides, an upper panel and a lower panel, and an opening between the upper panel and lower panel facing the cutting unit. One or more retaining structures are integral with the lower wall or panel. The reinforcing member may be inserted through the retaining structure or structures that are integrally formed with the lower panel adjacent the opening. Each retaining structure may be a channel, passage, opening, cavity, groove, hollow, notch, slot, hole, indentation, tunnel, port, aperture or recess that is integral with the lower panel.

DESCRIPTION OF THE PREFERRED EMBODIMENT

Figure 1:
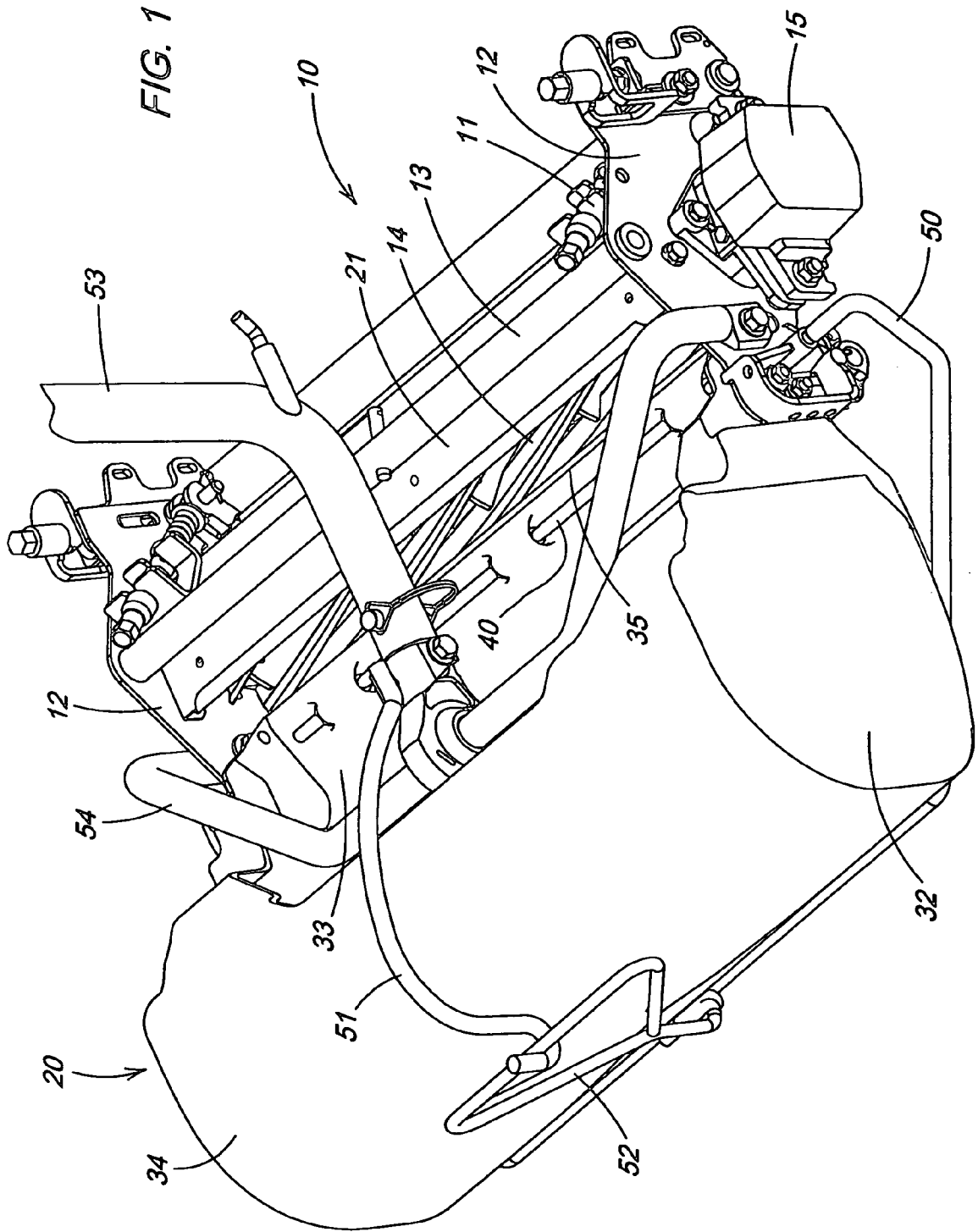
FIG. 1 is an elevated perspective view of a reel-type cutting unit and a reinforced grass catcher according to one embodiment of the invention.
Figure 2:
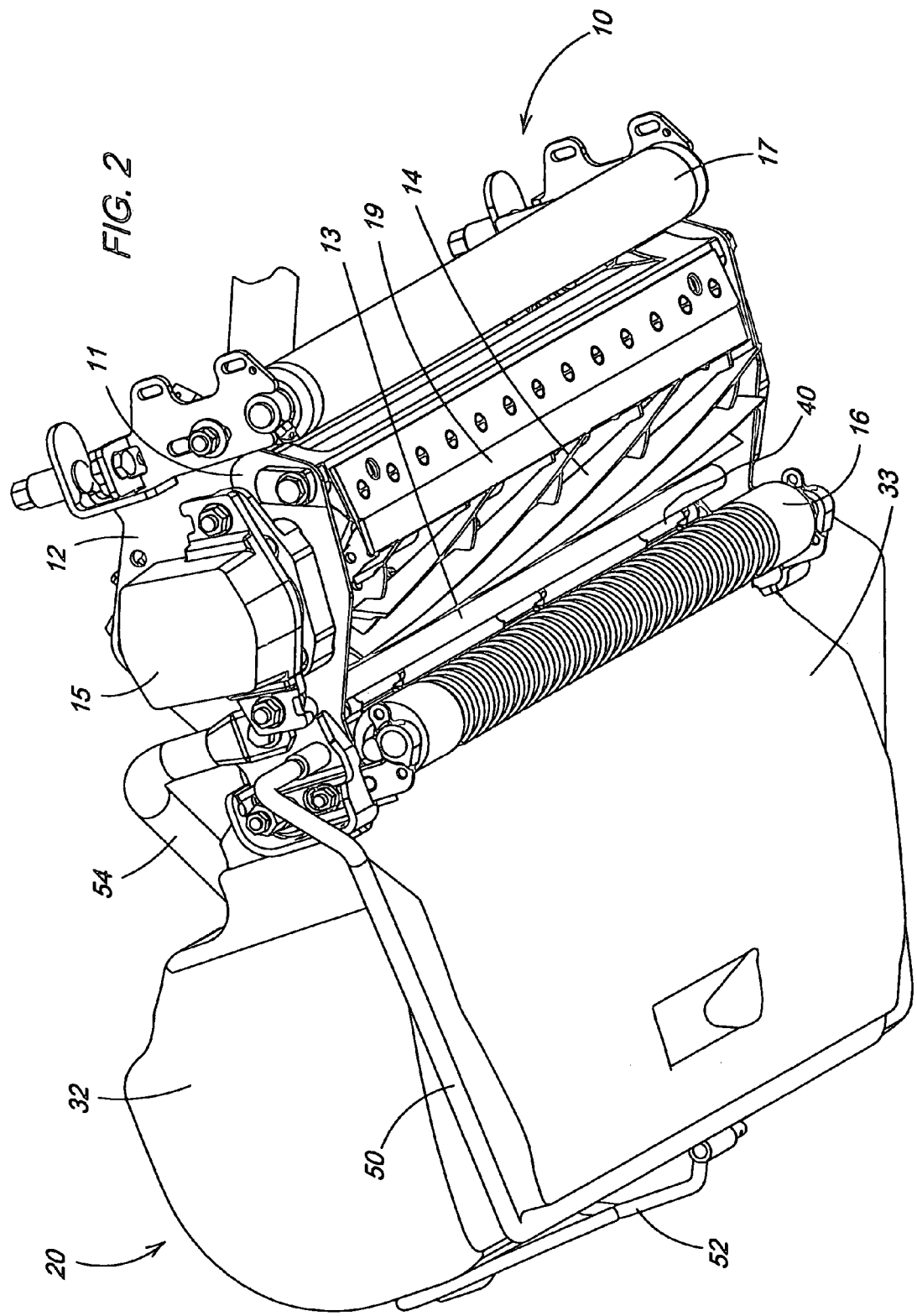
FIG. 2 is a perspective view of the reel-type cutting unit and reinforced grass catcher of FIG. 1, viewed from below the cutting unit and reinforced grass catcher.

Referring to FIGS. 1 and 2, cutting unit 10 and reinforced grass catcher 20 are shown for a reel-type mower in one embodiment of the invention. Reel-type mowers include walk behind mowers and riding mowers, and may be referred to as fairway mowers, gang mowers,-greens mowers, and various other reel-type mowers that cut grass between a reel rotating on a generally horizontal axis, and a bedknife. A reel-type mower may include one cutting unit, or may include two or more cutting units. Each cutting unit in a reel-type mower may have a cutting width typically between about 15 inches and about 30 inches.

In other embodiments, the reinforced grass catcher may be used with a rotary-type mower. Rotary mowers may be walk behind or riding mowers, and include lawn or garden tractors with mowing units mounted thereto, zero turn mowers, and a variety of other commercial or consumer mowing equipment that cut grass by rotating blades under a deck, on a generally vertical axis. Rotary mowers may include one cutting unit, or two or more cutting units. Each cutting unit of a rotary mower may have a cutting width typically between about 15 inches and about 24 inches.

Still referring to FIGS. 1 and 2, in one embodiment, reel-type cutting unit 10 may include frame 11 with side frames 12 on each side, and one or more laterally extending support bars 13. Frame 11 supports cutting reel 14 driven by motor 15 for rotation about a generally horizontal and laterally extending axis. Front and rear rollers 16 and 17 may be coupled to side frames 12 with attachment brackets 18. Rollers 16 and 17 may contact the ground during operation, and may be adjusted up or down to change the cutting height of cutting unit 10. During operation of the cutting unit, grass may be cut between rotating reel blades of cutting reel 14 and bedknife 19 mounted between side frames 12. Reinforced grass catcher 20 may be carried or positioned directly in front of or directly behind cutting unit 10 for receiving clippings that have been cut by cutting reel 14. In one embodiment, the reel-type mower also may have a plate 21 which deflects the clippings into the reinforced grass catcher.

Figure 3:
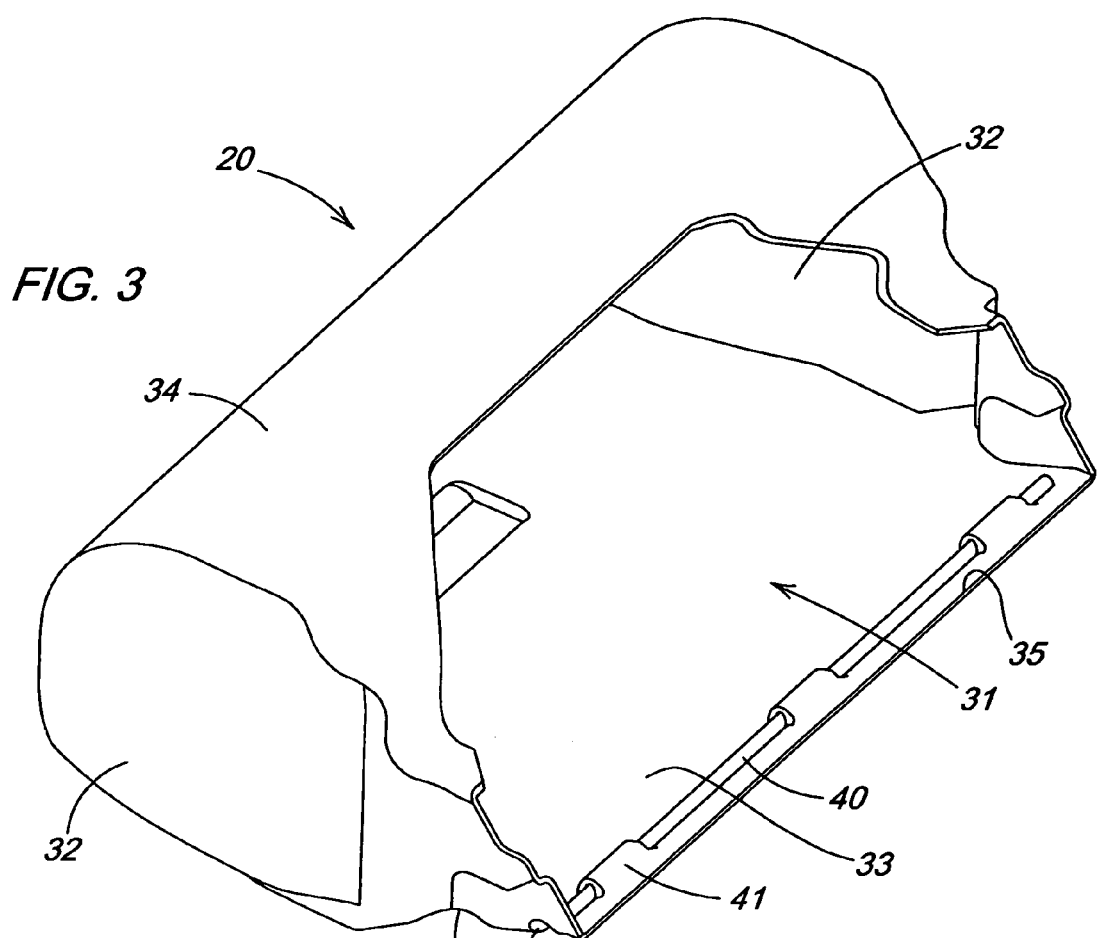
FIG. 3 is an elevated perspective view of one embodiment of a reinforced grass catcher.
Figure 4:
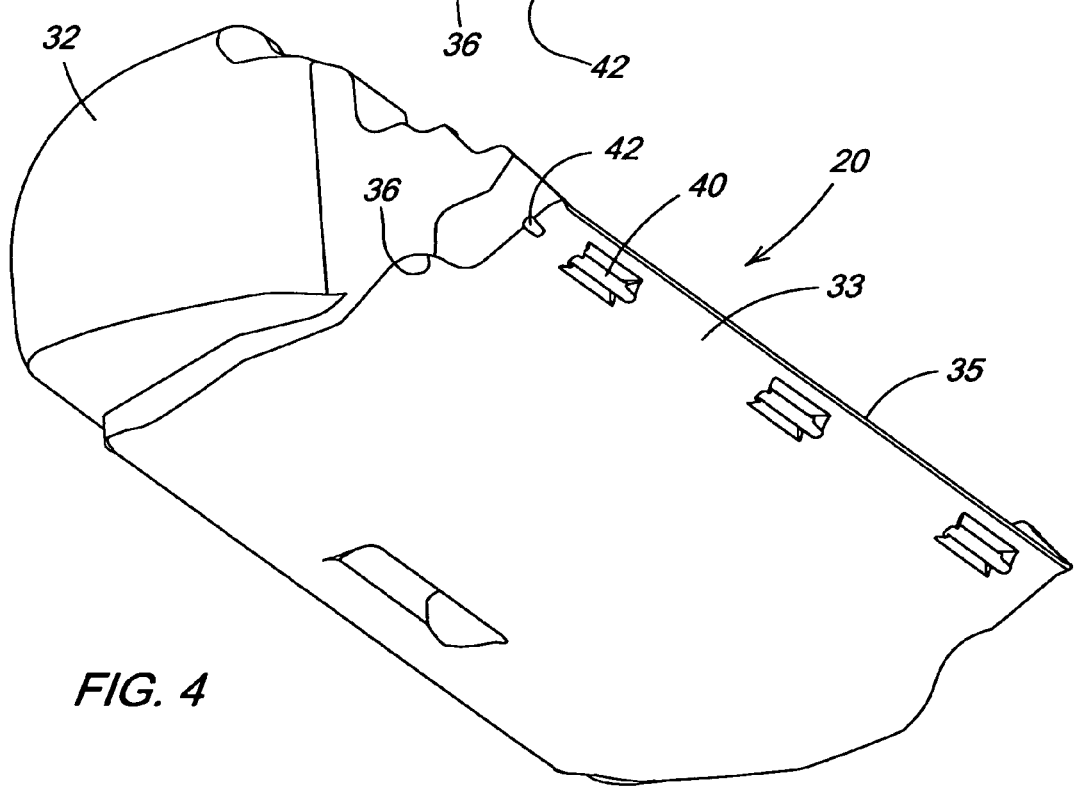
FIG. 4 is a perspective view of the reinforced grass catcher of FIG. 3, viewed from below the reinforced grass catcher.

Now referring to FIGS. 3 and 4, in one embodiment, reinforced grass catcher 20 may be a generally box-shaped structure with opening 31 facing the cutting unit to receive grass clippings discharged by the cutting unit. The reinforced grass catcher may have opposing sides 32, lower wall or panel 33, and upper wall or panel 34. In one embodiment, the upper wall or panel may have a generally arcuate or curved shape extending between the top of opening 31 and the lower wall or panel. The lower wall or panel of the reinforced grass catcher may include lip 35 facing the cutting unit. When in use, lip 35 is positioned next to the cutting unit. For example, the lip may engage, abut, touch or rest on a corresponding surface of the cutting unit, such as lateral extending support bar 13.

In one embodiment, a support assembly may be provided for positioning the reinforced grass catcher adjacent cutting unit 10. For example, the support assembly may include lower support arm 50 that extends from the cutting unit at least partially under and/or around the lower wall or panel of the reinforced grass catcher. Additionally, the support assembly may include upper support arms 51, 52 which may extend generally over the upper wall or panel of the reinforced grass catcher, and may be coupled or uncoupled to facilitate removal and replacement of the reinforced grass catcher. In one embodiment, upper support arm 51 may be attached to lift arm 53. Yoke 54 also may be attached to lift arm 53 which may be used for lifting cutting unit 10 to a transport position and lowering the cutting unit to a cutting position. The lift arm and yoke allow the cutting unit to move and pivot to follow the contours of the ground and to cut grass at a height set by adjustment of rollers 16, 17. It will be recognized that many other support assemblies may be used to support the reinforced grass catcher, without departing from the present invention.

In one embodiment, reinforced grass catcher 20 may include a one piece box-like structure molded or formed from plastic or other similar rigid or semi-rigid materials. For example, the reinforced grass catcher may be molded from thermoplastic, thermosetting plastic or other high polymer material. The walls of the box-like structure material may have substantially uniform thickness. For example, the wall thickness may be from about 1 mm to 10 mm, and most preferably about 4 mm.

When in use, according to one embodiment, lip 35 of the reinforced grass catcher may be raised or elevated to a horizontal plane that is generally higher than the horizontal plane of at least some other portions of lower wall or panel 33. The elevated lip helps the reinforced grass catcher retain grass clippings which are directed generally downwardly after the clippings enter the reinforced grass catcher. Additionally, in one embodiment, the lower wall or panel may have one or more contoured bottom surface portions. For example, the lower wall or panel may define a shape that generally conforms to underlying components of the cutting unit. In one embodiment, the lower wall or panel may include concave surface portion 36 extending laterally between opposing sides 32, dimensioned to fit over roller 16 without interfering with roller movement.

The reinforced grass catcher may include reinforcing member 40 that extends laterally across at least a portion of the lower wall or panel adjacent the lip. The reinforcing member may be dimensioned to extend across most or all of the span between opposing sides 32 of the reinforced grass catcher. In one embodiment, the reinforcing member may be a metal rod. The rod helps resist or limit warping, bending, or other damage to the lower wall or panel adjacent lip 35. The rod also helps maintain the lip in engagement or contact with the corresponding surface of the cutting unit, so that a gap is not opened between the reinforced grass catcher and the cutting unit.

In one embodiment, rod 40 may be metal, but other stiff materials also may be used. In one embodiment, the rod may have a generally cylindrical or tubular cross section, but alternatively may have an oval, oblong, rectangular, square, triangular or other shape cross section. The rod may have a substantially uniform diameter, for example about 3/8 inch, although the diameter may be larger or smaller as needed. The rod may be solid or hollow, and at least one end of the rod may be generally conical or convex in shape which may help insertion of the rod through the retaining structures that will be described below. The rod length may depend at least in part on the width of the cutting unit. For example, the rod length may be less than the span between opposing sides 32 of the reinforced grass catcher.

In one embodiment, the reinforcing member may be retained at or near the lip of the reinforced grass catcher using one or more retaining structures 41, 42 that are integral with the lower wall or panel. For example, the retaining structures may be channels, passages, openings, cavities, grooves, hollows, notches, slots, holes, indentations, tunnels, ports, apertures or recesses. The retaining structures hold the reinforcing member, such as the rod, in place and resist or limit movement of the reinforcing member, laterally, axially, or in any other direction. In one embodiment, the retaining structures hold the reinforcing member in place adjacent the lip of the reinforced grass catcher without the need for additional attachment hardware such as rivets, threaded fasteners, or pins. The retaining structures act as the primary restraint against movement of the reinforcing member.

For example, one or more retaining structures may be molded into the lower wall or panel of the reinforced grass catcher at or adjacent lip 35. In one embodiment, retaining structures may be offset surfaces 41 integrally molded into the reinforced grass catcher adjacent the lip, each offset surface providing a channel or passage which grips the reinforcing member with a press fit. Each retaining structure may be any length but not longer than the span between the opposing sides. For example, each offset surface may be between about one inch and six inches in length. The retaining structures may leave some of the reinforcing member at least partially exposed and uncovered facing upwardly and/or facing downwardly. The retaining structures, such as offset surfaces, may have substantially the same thickness as the walls of the grass catcher. Thus, the retaining structures may be formed without varying the material thickness from that of the walls.

The retaining structures may be access hole(s) 42 in one or both of opposing side panels 32. The access hole(s) may extend completely or partially through the side panel, and may be used for inserting the reinforcing member.

In one embodiment, the internal dimensions of each retaining structure may be no larger than the outer cross-sectional dimension of the reinforcing member, such as the diameter of the rod. The reinforcing member may be engaged to the retaining structures under manufacturing and/or assembly conditions in which the plastic or other material is at least somewhat flexible, malleable or pliable. For example, during manufacture and assembly of the reinforced grass catcher, the plastic may be at a temperature sufficiently above ambient so that the reinforcing structures stretch enough for the rod to be readily inserted through them. When the temperature of the reinforced grass catcher is at ambient, the retaining structures provide a firm grip, or press fit, on the rod. For example, one or more access holes in the side panels may be under sized so that the reinforcing member may be inserted when the plastic is malleable, and the reinforcing member may not be easily removed later.

Having described a preferred embodiment, it will become apparent that various modifications can be made without departing from the scope of the invention as defined in the accompanying claims.

The invention claimed is:

1. An apparatus comprising:
a reinforced one-piece molded plastic grass catcher for a reel-type mower having a ground contacting roller, the grass catcher having an opening with a lower lip facing the reel-type mower and a lower panel extending over the roller, a reinforcing rod inserted through an access hole in the grass catcher and extending laterally across at least a portion of the lower lip, and a plurality of retaining structures integrally molded into the lower lip gripping the reinforcing rod in place by a press fit.

2. The apparatus of claim 1 wherein the reinforced grass catcher further comprises a plastic box-like structure having walls with substantially uniform thickness, each of the integral retaining structures having substantially the same thickness as the walls.

3. The apparatus of claim 1 further comprising a lower wall and wherein the lower lip is in a horizontal plane above at least some portions of the lower wall.

4. The apparatus of claim 1 wherein the plurality of integral retaining structures have an internal dimension, and the reinforcing rod has an outer cross sectional dimension no smaller than the internal dimension of the integral retaining structures.

5. The apparatus of claim 1 wherein the lower panel has a contoured bottom surface portion dimensioned to fit over the roller without interfering with roller movement.

* * * * *